(12) United States Patent
Feller

(10) Patent No.: US 7,995,318 B1
(45) Date of Patent: Aug. 9, 2011

(54) HIGH FREQUENCY POWER CONVERTER

(76) Inventor: Murray F Feller, Micanopy, FL (US)

( * ) Notice: Subject to any disclaimer, the term of this patent is extended or adjusted under 35 U.S.C. 154(b) by 0 days.

(21) Appl. No.: 13/014,157

(22) Filed: Jan. 26, 2011

(51) Int. Cl.
*H02H 3/20* (2006.01)

(52) U.S. Cl. .......................... 361/91.7; 323/282; 331/56

(58) Field of Classification Search .................. 323/222, 323/282, 285, 288, 272; 361/56, 65, 91.7, 361/154, 155; 331/19, 38, 77, 172, 179; 73/42, 64, 861.11–861.17
See application file for complete search history.

(56) References Cited

U.S. PATENT DOCUMENTS

| 4,144,751 | A | * | 3/1979 | Yokoyama | ................. 73/861.11 |
| 4,462,262 | A | * | 7/1984 | Kahnke | ...................... 73/861.05 |
| 5,125,087 | A | * | 6/1992 | Randell | ........................ 712/227 |
| 5,745,352 | A | * | 4/1998 | Sandri et al. | .................... 363/41 |
| 6,531,854 | B2 | * | 3/2003 | Hwang | ......................... 323/285 |
| 7,221,216 | B2 | * | 5/2007 | Nguyen | ......................... 330/10 |
| 7,808,224 | B2 | | 10/2010 | Honda | |

* cited by examiner

*Primary Examiner* — Rajnikant Patel
(74) *Attorney, Agent, or Firm* — David Kiewit

(57) ABSTRACT

Power at a selected frequency in the high frequency region of the spectrum is supplied by a power converter having a wide range of input voltages. The power converter uses a source oscillator and a NOR gate. The source oscillator generates a rectangular wave at the selected frequency and supplies that signal to one of the NOR gate inputs. The rectangular wave is differentiated and the differentiated signal is supplied to the second NOR input along with a feedback signal from an amplifier controlled by the NOR gate's output.

9 Claims, 4 Drawing Sheets

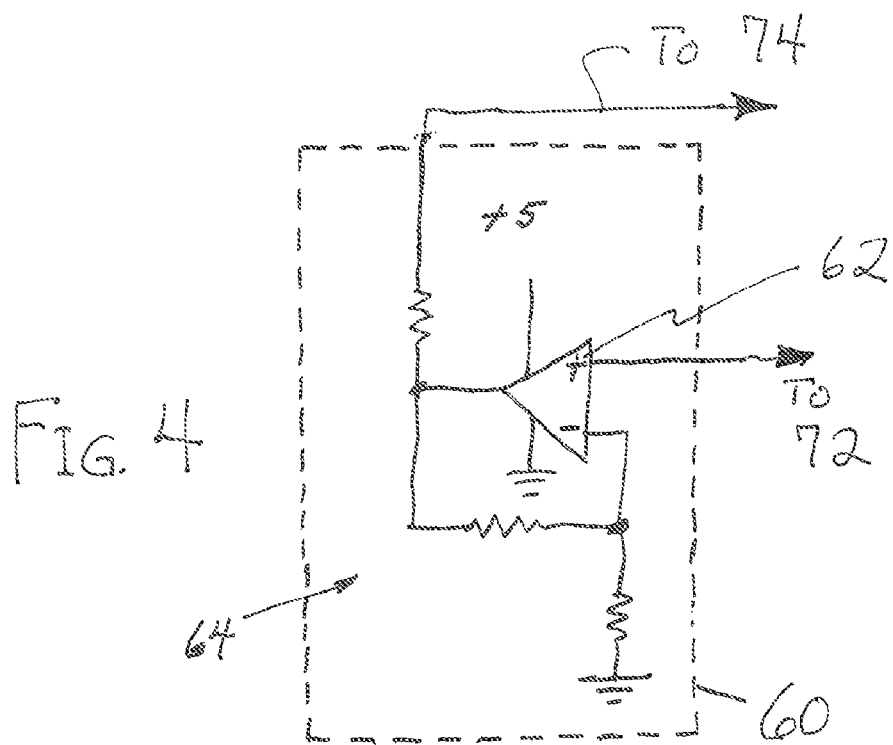

US 7,995,318 B1

HIGH FREQUENCY POWER CONVERTER

BACKGROUND OF THE INVENTION

The invention relates to self-regulating electrical power supplies, with particular emphasis being given to those operable in the high frequency region of the electromagnetic spectrum.

BACKGROUND INFORMATION

Pulse width control techniques are commonly used to regulate the output power in switch mode power supplies and amplifiers. Circuits that use this approach typically operate at output frequencies from tens to hundreds of KHz with a few recently introduced low voltage ones being operational up to a few MHz. At higher frequencies the control of the pulse width normally becomes difficult as the pulse widths are narrowed.

Higher frequency power supplies are of particular interest for those applications for which space is at a premium as the higher operating frequency enables smaller power supply components such as capacitors, inductors and transformers to be used for the same power capability. Furthermore, these smaller components are less expensive. These supplies also enable further product reductions in size and cost when used with high frequency equipment such as ultrasonic flow meters. These meters typically operate at ultrasonic frequencies in the 0.5 to 4 MHz range and detect tiny signals which can be easily interfered with. Hence, a conventional power converter operating at a few hundred KHz could easily have its conducted and radiated fundamental frequency, and/or its harmonic noise signals in the pass band of the desired signals thereby degrading its operation. A high frequency power supply with a fundamental frequency higher than the operating frequency of the meter (e.g., 6 MHz) has its conducted and radiated fundamental and harmonic noise signals well above the meter operating frequency and is therefore less likely to interfere with the meter's operation.

BRIEF SUMMARY OF THE INVENTION

One aspect of the invention is that it provides a high frequency power supply comprising a source oscillator circuit portion, a differentiation circuit portion and a coincidence-responsive logic gate. In this arrangement, the source oscillator circuit portion generates a rectangular source wave having an output frequency that is the same as that outputted from the high-frequency power supply. The differentiation circuit portion generates a differential signal of the rectangular source wave. The coincidence-responsive logic gate supplies a control voltage to an amplifier circuit portion. This control signal is generated responsive to the coincidence-responsive logic gate receiving, at one of its two input terminals, the rectangular source wave and receiving, and simultaneously receiving, at the other of the two input terminals, both the differential signal from the rectangular source wave and a feedback signal generated by the amplifier circuit portion.

Those skilled in the art will recognize that the foregoing broad summary description is not intended to list all of the features and advantages of the invention. Both the underlying ideas and the specific embodiments disclosed in the following Detailed Description may serve as a basis for alternate arrangements for carrying out the purposes of the present invention and such equivalent constructions are within the spirit and scope of the invention in its broadest form. Moreover, different embodiments of the invention may provide various combinations of the recited features and advantages of the invention, and that less than all of the recited features and advantages may be provided by some embodiments.

BRIEF DESCRIPTION OF THE SEVERAL VIEWS OF THE DRAWING

FIG. 4 is a circuit schematic of optional components added to the circuit of FIG. 1 to improve regulation with changes in load resistance and input voltage.

DETAILED DESCRIPTION OF A PREFERRED EMBODIMENT

In studying this Detailed Description, the reader may be aided by noting definitions of certain words and phrases used throughout this patent document. Wherever those definitions are provided, those of ordinary skill in the art should understand that in many, if not most, instances such definitions apply both to preceding and following uses of such defined words and phrases.

An ideal rectangular wave, as used herein, is characterized by a voltage that rises steeply at a leading edge of a pulse, stays essentially constant for a duration of the pulse, and drops steeply at a trailing edge of the pulse. Those skilled in the art will appreciate that some departure from this ideal description is found in actual rectangular waves. A square wave is a special sort of rectangular wave having a fifty percent duty cycle.

A coincidence-responsive logic gate, as used herein is an active electronic circuit element having an output when two of its inputs have the same value at the same time. AND or NOR gates are particular species of coincidence-responsive gates. As is known in the art, an AND gate provides a high output if and only if both of its two inputs are high. Correspondingly, a NOR gate supplies a high output if and only if both of its inputs are low.

Figure 1:
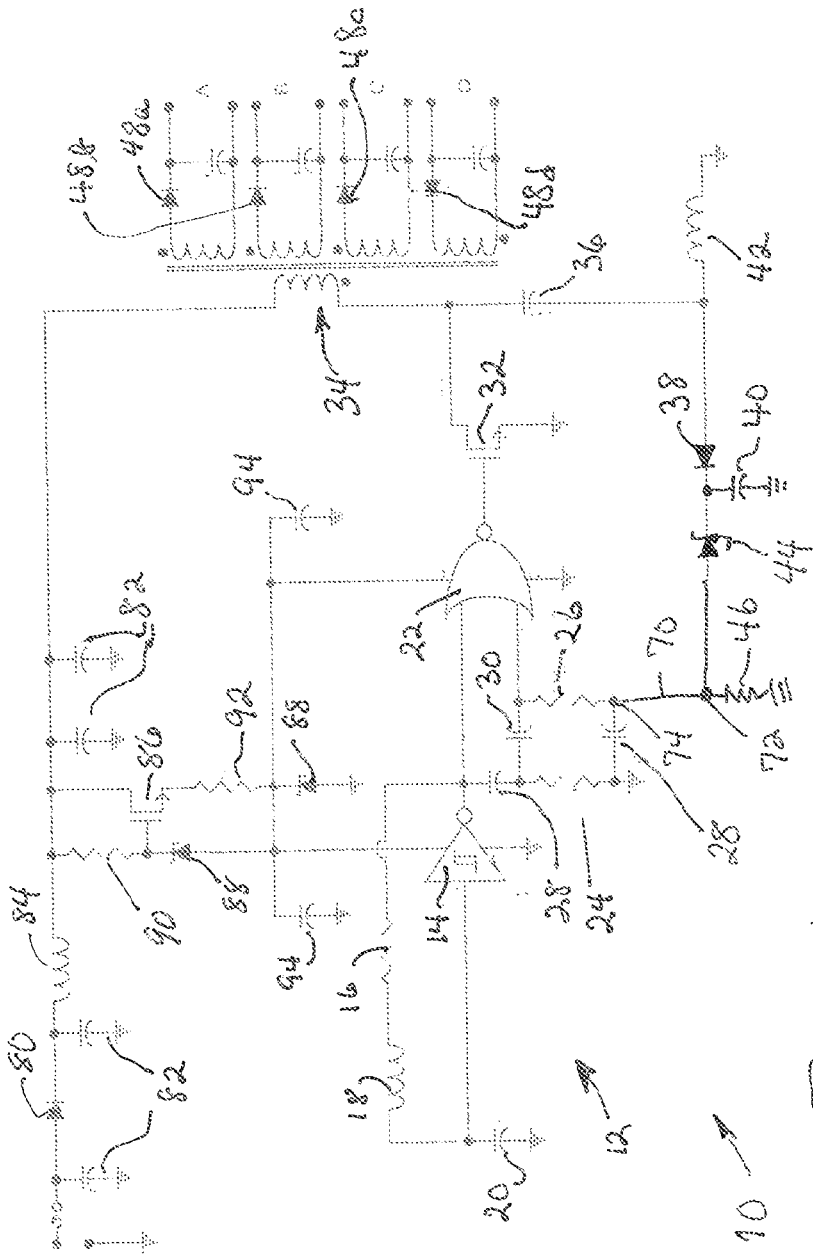
FIG. 1 is a schematic circuit diagram of a high frequency power supply of the invention.

Turning now to FIG. 1, one finds a schematic depiction of a power converter 10 of the invention in which a source oscillator portion 12 defines an output frequency. A preferred source oscillator portion comprises a Schmitt trigger 14, and an oscillator feedback resistor 16, inductor 18 and capacitor 20. In a particular preferred embodiment, in which the Schmitt trigger 14 is a Model NC7SZ14 from the Fairchild Semiconductor Company, the source resistor 15 has a value of 499 ohms, the source inductor 18 has a value of about one hundred milliHenrys and the source capacitor 20 has a value of ten microfarads In this case the source oscillator portion 12 supplies a six MHz square wave. Those skilled in the art will appreciate that many other circuit arrangements, e.g., one based on a comparator (not shown), could provide the source oscillator function. The depicted one is preferred because of its low cost and low parts count.

A rectangular source wave output from the source oscillator portion 12 is supplied to a first input of a NOR gate 22. The source wave is also differentiated by a two-stage differentiating circuit comprising first and second differentiating resistors 24, 26 and first and second differentiating capacitors 28, 30 before being applied to the second input of the NOR gate 22. In a particular preferred embodiment, the NOR gate 22 is a model NC7SZ02 supplied by the Fairchild Semiconductor Corporation. This NOR gate is characterized by a sharply defined switching level typically intermediate between its ground and its supply voltage, and can switch between output high and low states within a few nanoseconds. It may be noted that although the manufacturer of the preferred NOR gate recommends that the ten to ninety percent rise and fall times of the input signals are no greater than five nanoseconds, the tested apparatus operates with a differentiated input signal to the second input of the NOR gate vary over several hundred nanoseconds. By adjusting the DC level on the second input of the NOR gate 22 (i.e., the input having the differentiated signal supplied to it) the NOR gate's switch point can be controlled to vary the time period during which its output is high and to thereby vary the width of the output pulse.

Those skilled in the art will recognize that, conceptually at least, one could use an AND gate in a similar fashion to produce a similar output signal. Moreover, the skilled artisan will recognize that a single state differentiation circuit portion (e.g., configured by deleting the second differentiating resistor 26 and capacitor 30, and using only the first differentiating resistor 24 and capacitor 28) could also be used to supply the differentiated signal to the second input of the NOR gate 22.

In the preferred embodiment, an output control voltage pulse from the NOR gate 22 drives an amplifier 32 which is preferably a type BSS123 mosfet having a gate terminal connected to receive the control voltage from the NOR gate. The width of this output pulse controls the time that current flows into a transformer 34. At the end of this pulse the magnetic field in the transformer 34 collapses, producing a voltage pulse which provides (via the combination of capacitor 36 and a diode rectifier 38) a corresponding DC voltage across a reference capacitor 40. In this preferred arrangement a reference inductor 42 provides a ground reference for the rectified signal.

When the voltage across the reference capacitor 40 is sufficient for a Zener diode 44 to conduct (about 24V), current flows from the reference capacitor 40 through a feedback resistor 46 to raise the voltage applied to the second input of the NOR gate 22, thereby increasing its voltage and adjusting its switch level to reduce the pulse width used to drive the amplifier 32. This negative feedback signal tends to stabilize the magnitude of the amplifier output pulse.

Figure 2A:
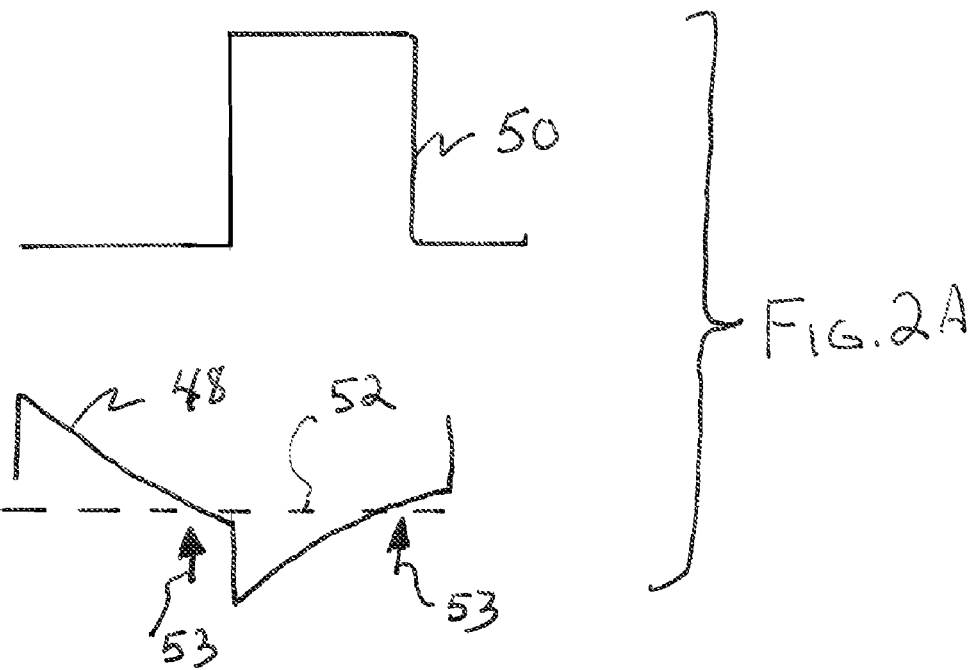
FIGS. 2A and 2B are timing diagrams depicting an input waveform and an output signal pulse from a NOR gate of the circuit of FIG. 1. The diagram of FIG. 2A pertains to a situation in which there is no feedback. The diagram of FIG. 2B depicts a case in which a feedback voltage is present.
Figure 2B:
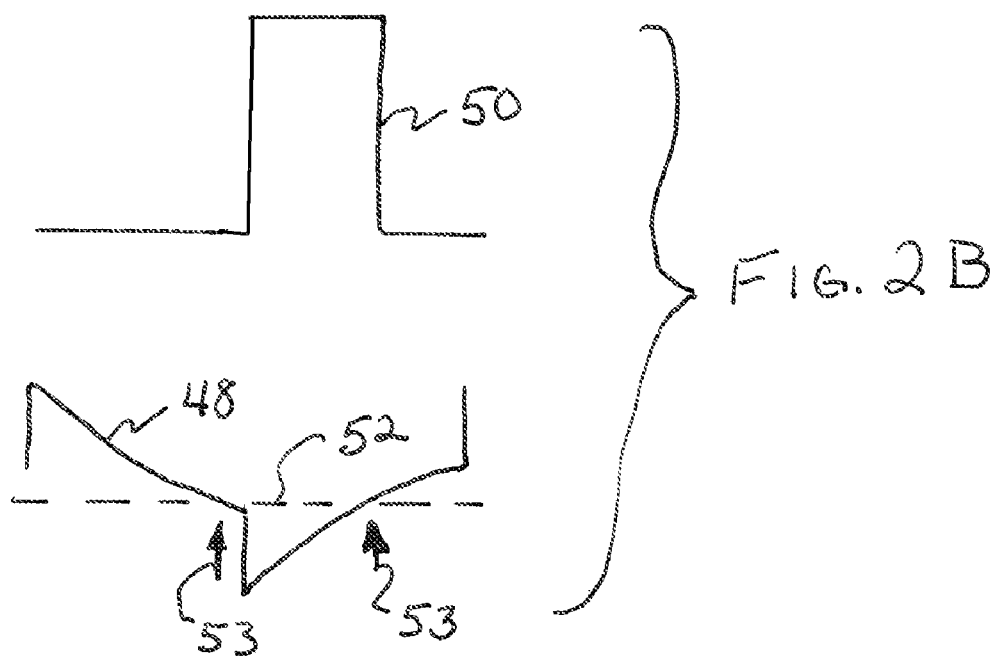

The exemplar feedback control arrangement is depicted schematically in FIGS. 2A and 2B. As noted above, both a source oscillator signal and a differentiated source oscillator signal 48 are input to the first input of the NOR gate 22 which has a positive output 50 when both inputs are below a switching level 52. In the schematic depiction of FIGS. 2A and 2B, the positive output 50 is initiated when the source oscillation signal goes negative, at which time the differentiated signal 48 is already low. The positive signal pulse ends when the differentiated signal rises above the switching level. In FIGS. 2A and 2B these switching times are indicated by arrows 53. When a feedback voltage is present, as depicted in FIG. 2B, the DC level of the differentiated source oscillator signal at the second input to the NOR gate increases relative to the NOR gate's switching level 52. Hence, the differentiated signal crosses the switch level 52 earlier, thus shortening the duration of the output pulse 50.

The switching control of the pulse width may be controlled by a feedback voltage within a high speed integrated circuit 22 in a manner which enables its output pulse to be smoothly controlled from the width of the oscillator's negative going signal to zero. When a square wave source oscillator is used, the control range is 180 degrees because the output pulse can be controlled from maximum to zero width. This is a useful feature in preventing the output voltage from the amplifier 32 rising to destructive levels in the event of its output loading being removed.

A negative feedback signal over the range of about two volts controls the duty cycle from 50% to 0%. The output voltage from the converter is therefore not highly regulated with changes in input voltage or output load. The regulation can be improved by adding a signal amplifier 60 in the feedback loop. When this amplifier has a gain of ten for example, a change of only 0.2 volts would be required for the same duty cycle control range so that the regulation would be correspondingly improved. The amplifier may not be necessary when linear regulators are used at the outputs of the converter.

In the foregoing, it may be noted that the secondaries of the transformer 34 preferably comprise rectifiers 48a-48d oriented to conduct when the stabilized pulse is present so that their output voltages reflect the regulation provided by the feedback loop. The skilled reader will appreciate that although the preferred embodiment provides an isolated output by means of the transformer 34, many other sorts of output stages can be driven by the disclosed combination of a logic gate and an amplifier.

The circuit can be used with oscillators having frequencies in the tens of MHz and still provide smooth duty cycle feedback control. Because the pulse width switch control is performed entirely within the NOR gate its response time can be extremely fast. Its relatively high frequency of operation reduces the possibility of the radiated or conducted signals from the converter interfering with the circuits that it is powering or in its vicinity when they are operated at substantially lower frequencies. Conventional power converters, by contrast, often operate at frequencies below that which will cause interference thereby requiring much more extensive and expensive conducted filtering and electromagnetic shielding.

Figure 3:
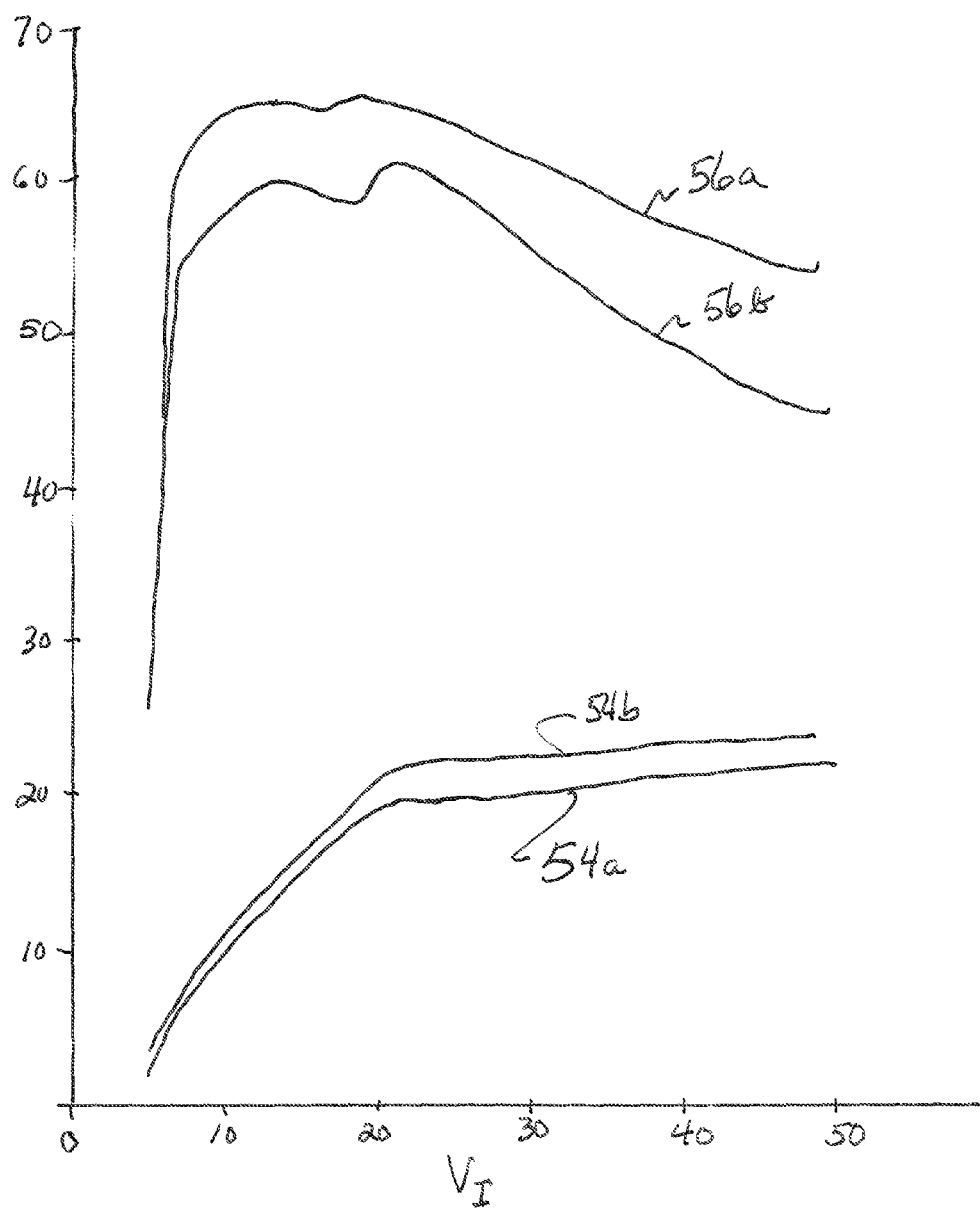
FIG. 3 is a graphical depiction of the output voltage and efficiency of the circuit of FIG. 1 as a function of input voltage for two different load resistances.

The load regulation and efficiency of the circuit 10 of FIG. 1 are graphically depicted as functions of the input voltage, $V_I$, in FIG. 3. Two output voltage curves 54a, 54b are shown for load resistances of 250Ω and 500Ω. Two curves of overall efficiency 56a, 56b are shown for the same choices of load resistances. The numerical values depicted along the vertical axis provide values of both the output, in volts, and the efficiency, in percent.

In a particular preferred embodiment of the invention briefly mentioned above, a regulating circuit portion 60, depicted in FIG. 4, may be used to improve regulation with load and with supply voltage variations. The regulating portion 60 may comprise a regulating amplifier 62, which may be a Model MCP6231 supplied by the MicroChip Corporation, and a resistive feedback network 64. This may be connected to the circuit depicted in FIG. 1 by removing a conducting link 70 and connecting the regulating circuit portion between the points labeled 72, 74 in FIG. 1

The power converter 10 of the invention is operable over a large range of input voltages, as previously discussed with reference to FIG. 3. A preferred input portion of the power converter 10 provides a reverse polarity protection diode and uses a plurality of capacitors 82 and an inductor for RFI suppression and bypassing. The regulated supply voltages for the two ICs 14, 22 are preferably provided by the combination of a mosfet 86 (which may be a BSS 123), two zener diodes 88, two resistors 90, 92, and two bypass capacitors 94.

Although the present invention has been described with respect to several preferred embodiments, many modifications and alterations can be made without departing from the invention. Accordingly, it is intended that all such modifications and alterations be considered as being within the spirit and scope of the invention as defined in the attached claims.

The invention claimed is:

1. A high frequency power converter comprising:
   a source oscillator circuit portion for generating a rectangular source wave having an output frequency outputted from the high-frequency power supply circuit;
   a differentiation circuit portion for generating a differentiated signal of the rectangular source wave;
   a coincidence-responsive logic gate for supplying a control voltage to an amplifier circuit portion responsive to receiving, at one of two input terminals, the rectangular source wave and responsive to receiving, at the other of the two input terminals, both the differentiated signal of the rectangular source wave and a feedback signal generated by the amplifier circuit portion.

2. The power converter of claim 1 wherein the source oscillator circuit portion comprises a Schmitt trigger.

3. The power converter of claim 1 wherein the coincidence-responsive logic gate comprises a NOR gate.

4. The power converter of claim 1 wherein the differentiation circuit portion comprises at least one resistor and at least one capacitor.

5. The power converter of claim 1 wherein the amplifier circuit portion comprises a field effect transistor having a gate terminal connected to receive the control voltage.

6. The power converter of claim 1 wherein the amplifier circuit portion comprises a regulating amplifier connected to receive a voltage signal from the amplifier output and to supply, responsive thereto, the feedback signal.

7. A method of supplying electric power at a selected high frequency, the method comprising the steps of:
   generating a rectangular wave at the high frequency;
   supplying the rectangular wave to a first input of a coincidence-responsive logic gate having two inputs;
   differentiating the rectangular wave supplying the differentiated rectangular wave to the second input of the coincidence responsive logic gate;
   supplying, as a control voltage, an output of the coincidence-responsive logic gate to an amplifier.

8. The method of claim 7 further comprising steps of generating a feedback signal responsive to the output of the amplifier and supplying the feedback signal to the second input of the coincidence-responsive logic gate.

9. The method of claim 7 wherein the coincidence-responsive logic gate comprises a NOR gate.

* * * * *